(12) United States Patent
Park et al.

(10) Patent No.: US 10,175,398 B2
(45) Date of Patent: Jan. 8, 2019

(54) INFRARED OPTICAL FILTER HAVING GLASS CERAMIC LAYER COMPRISING 19-20% POTASSIUM OXIDE

(71) Applicant: Hyundai Motor Company, Seoul (KR)

(72) Inventors: Sung June Park, Osan-si (KR); Sang Young Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 26 days.

(21) Appl. No.: 15/340,854

(22) Filed: Nov. 1, 2016

(65) Prior Publication Data

US 2017/0343711 A1 Nov. 30, 2017

(30) Foreign Application Priority Data

May 30, 2016 (KR) .................. 10-2016-0066703

(51) Int. Cl.
*G02B 5/28* (2006.01)
*G02B 5/20* (2006.01)
*G02B 5/22* (2006.01)
*C03C 4/10* (2006.01)

(52) U.S. Cl.
CPC ............. *G02B 5/281* (2013.01); *G02B 5/208* (2013.01); *G02B 5/226* (2013.01); *C03C 4/10* (2013.01); *G02F 2203/055* (2013.01)

(58) Field of Classification Search
CPC .............. B32B 17/06; B32B 17/10431; B32B 17/10449; B32B 2307/42; C03C 4/10; C03C 17/23–17/27; C03C 17/34; C03C 17/3411; C03C 17/3417; G02B 5/208; G02B 5/226; G02B 5/281; G02F 2202/09; G02F 2203/055

USPC ....... 65/60.1, 60.2, 60.5; 252/582, 584, 587; 359/350, 359, 360, 580, 585, 586, 588, 359/589, 590; 362/510; 428/410, 426, 428/428; 510/68, 905

See application file for complete search history.

(56) References Cited

U.S. PATENT DOCUMENTS

| | | | |
|---|---|---|---|
| 8,017,537 B2* | 9/2011 | Seto | C03C 3/087 428/410 |
| 2004/0114114 A1* | 6/2004 | Yano | G02B 5/283 353/84 |
| 2011/0085233 A1* | 4/2011 | Furusato | G02B 1/115 359/359 |
| 2013/0105744 A1 | 5/2013 | Ogawa et al. | |
| 2014/0033766 A1* | 2/2014 | Maehara | C03B 5/2252 65/66 |
| 2015/0166403 A1* | 6/2015 | Yamamoto | C03C 3/083 428/410 |

FOREIGN PATENT DOCUMENTS

| | | |
|---|---|---|
| JP | 11-100230 A | 4/1999 |
| JP | 11-100231 A | 4/1999 |
| JP | 2006-259124 A | 9/2006 |
| JP | 2012-501285 A | 1/2012 |

(Continued)

*Primary Examiner* — Stephone B Allen
*Assistant Examiner* — Ryan S Dunning
(74) *Attorney, Agent, or Firm* — Morgan, Lewis & Bockius LLP

(57) ABSTRACT

An infrared optical filter may include a glass ceramic layer, a multilayer oxide thin film formed on a first surface of the glass ceramic layer, and a low reflectivity coating layer formed on a second surface of the glass ceramic layer.

11 Claims, 4 Drawing Sheets

(56) References Cited

FOREIGN PATENT DOCUMENTS

| | | |
|---|---|---|
| KR | 10-2000-0065216 A | 11/2000 |
| KR | 10-2013-0018191 A | 2/2013 |
| KR | 10-2015-0035711 A | 4/2015 |
| KR | 10-2016-0005041 A | 1/2016 |

* cited by examiner

INFRARED OPTICAL FILTER HAVING GLASS CERAMIC LAYER COMPRISING 19-20% POTASSIUM OXIDE

CROSS-REFERENCE TO RELATED APPLICATION

The present application claims priority to Korean Patent Application No. 10-2016-0066703, filed May 30, 2016, the entire contents of which is incorporated herein for all purposes by this reference.

BACKGROUND OF THE INVENTION

Field of the Invention

The present invention relates to an infrared optical filter. More particularly, to an infrared optical filter having a high visible light blocking rate and a high infrared light transmittance.

Description of Related Art

Recently, research and development on Advanced Driver Assistance Systems (ADAS) is being vigorously carried out.

Specifically within this research, a Driver State Monitoring System (DSM) plays important roles in securing driver safety.

The DSM is mainly operated in a manner in which a driver's eye state is sensed, drowsy driving, drunken driving, etc. are judged based on the sensed driver's eye state, and then an alarm is activated.

That is, operation of the DSM starts from recognition of the driver's eyes. To this end, the DSM includes a lamp to emit light. Light emitted from the lamp passes through a lens, reaches a driver to recognize THE driver's eyes or face, and then returns to the lens so as to analyze an acquired image.

Here, if light emitted from the lamp includes visible light, the visible light may hinder a driver from driving a vehicle and, if light emitted from the lamp includes ultraviolet light, the ultraviolet light may cause disease of the driver's eyes or skin.

Therefore, an optical filter which may selectively transmit only infrared light (hereinafter, referred to as an "infrared optical filter") is applied to the lens of the DSM. Thereby, among light emitted from the lamp, only infrared light reaches the driver's eyes or face and thus the above mentioned problems may be prevented.

Conventionally, glass ceramic having a dark color, acquired by mixing a colorant and/or a decolorant with a glass precursor and then ceramifying a mixture, was used as an infrared optical filter. For example, the related art discloses a glass ceramic product, which transmits only infrared light, manufactured by adding a colorant (vanadium oxide) and a decolorant (iron oxide or cesium oxide), absorbing visible light, to glass ceramic.

However, since additives, such as colorants, decolorants, etc., artificially darken the color of a glass composition, conventional infrared optical filters have a low infrared light transmittance as well as a low visible light transmittance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an infrared optical filter which completely blocks visible light and ultraviolet light but does not influence infrared light transmittance.

According to various aspects of the present invention, an infrared optical filter may include a glass ceramic layer, a multilayer oxide thin film formed on a first surface of the glass ceramic layer, and a low reflectivity coating layer formed on a second surface of the glass ceramic layer.

The glass ceramic layer may include 60 to 70% by weight of silicon oxide (SiO2), 0.1 to 1% by weight of aluminum oxide (Al2O3), 10 to 20% by weight of sodium oxide (Na2O), 10 to 20% by weight of potassium oxide (K2O), 0.01 to 0.1% by weight of titanium dioxide (TiO2), and 0.1 to 1% by weight of selenium (Se).

The glass ceramic layer may include 10 to 20% by weight of potassium oxide (K2O) without a colorant and a decolorant.

The multilayer oxide thin film may be formed by alternately stacking a first thin film including silicon (Si) and a second thin film including titanium (Ti).

The multilayer oxide thin film may include a total of 10 to 50 layers and have a thickness ranging from 1 to 100 μm.

The first thin film may have a thickness ranging from 10 to 500 nm, and the second thin film may have a thickness ranging from 10 to 500 nm.

The first thin film may be formed of silicon oxide (SiO2), and the second thin film may be formed of titanium dioxide (TiO2).

The first thin film may have a refractive index ranging from 1.45 to 1.55, and the second thin film may have a refractive index ranging from 2.40 to 2.60.

A difference between the refractive index of the first thin film and the refractive index of the second thin film may range from 0.95 to 1.15.

The low reflectivity coating layer may be formed by stacking a first coating layer including silicon (Si) and a second coating layer including zirconium (Zr).

The low reflectivity coating layer may have a total of 2 to 10 layers and a thickness ranging from 100 nm to 1 μm.

The first coating layer may have a thickness ranging from 10 to 200 nm, and the second coating layer may have a thickness ranging from 10 to 200 nm.

The first coating layer may be formed of silicon oxide (SiO2), and the second coating layer may be formed of zirconium oxide (ZrO2).

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
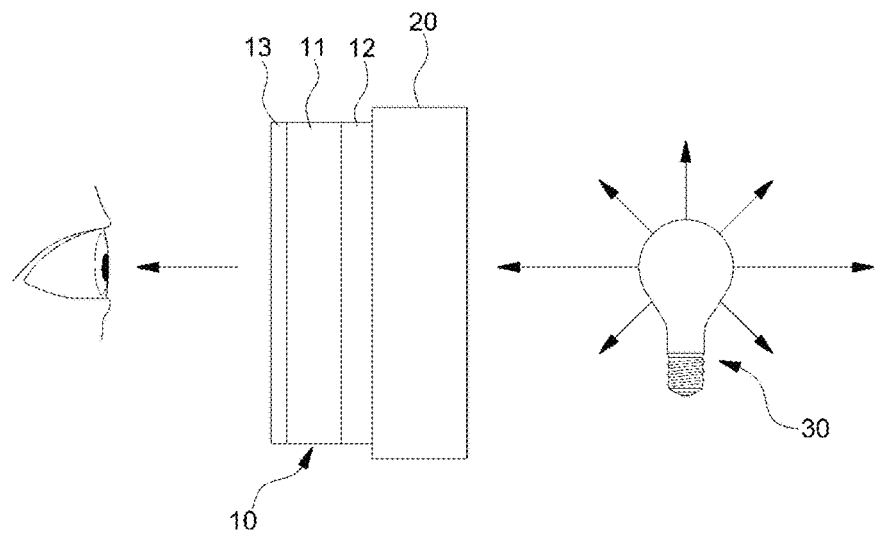
FIG. 1 is a view illustrating an infrared optical filter in accordance with various embodiments of the present invention.

FIG. 1 is a view illustrating an infrared optical filter in accordance with various embodiments of the present invention. More specifically, FIG. 1 illustrates a case that a lens 20, to which an infrared optical filter 10 of the present invention is applied, is disposed in front of a light source 30.

The infrared optical filter 10 may include a glass ceramic layer 11, a multilayer oxide thin film 12 formed on one surface of the glass ceramic layer 11, and a low reflectivity coating layer 13 formed on the other surface of the glass ceramic layer 11. The multilayer oxide thin film 12 may be formed on one surface of the glass ceramic layer 11 in a direction toward the light source 30.

The glass ceramic layer 11 absorbs visible light and ultraviolet light out of light passing through the infrared optical filter 10 and transmits only infrared light.

Conventionally, by adding a colorant, a decolorant, etc. to a glass precursor, an acquired glass ceramic layer has a dark color so as to absorb visible light and ultraviolet light. However, the glass ceramic layer has a low infrared light transmittance and may not be used in a Driver State Monitoring System (DSM) requiring infrared light transmittance of 80% or more.

One technical characteristic of various embodiments of the present invention is to provide a glass ceramic layer 11 including an increased content of potassium oxide (K2O) instead of addition of a colorant and a decolorant, so as to absorb only visible light and ultraviolet light but not infrared light.

The glass ceramic layer 11 may include 1 to 20% by weight of potassium oxide (K2O), preferably 10 to 20% by weight of potassium oxide (K2O), more preferably 15 to 20% by weight of potassium oxide (K2O), and more preferably 19 to 20% by weight of potassium oxide (K2O).

If the content of potassium oxide (K2O) is less than 10% by weight, the glass ceramic layer 11 may not sufficiently absorb visible light and ultraviolet light and, if the content of potassium oxide (K2O) exceeds 20% by weight, infrared light transmittance of the glass ceramic layer 11 may be lowered.

The glass ceramic layer 11, in addition to potassium oxide (K2O), may further include 60 to 70% by weight of silicon oxide (SiO2), 0.1 to 1% by weight of aluminum oxide (Al2O3), 10 to 20% by weight of sodium oxide (Na2O), 0.01 to 0.1% by weight of titanium dioxide (TiO2), and 0.1 to 1% by weight of selenium (Se).

Figure 2:
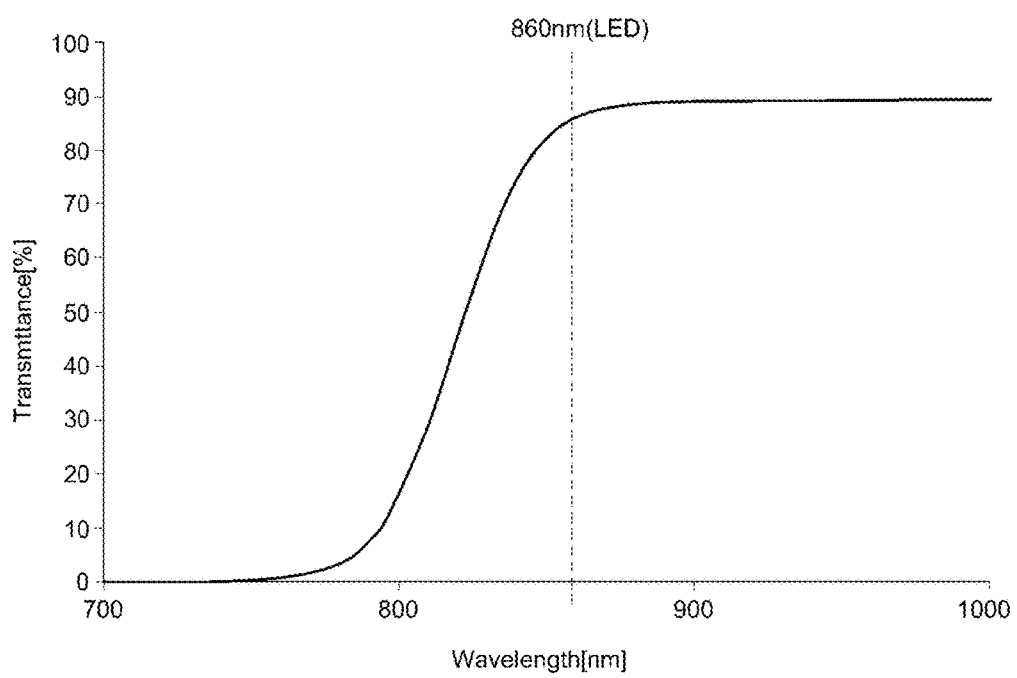
FIG. 2 is a graph illustrating a result of measurement of transmittance of a glass ceramic layer in accordance with various embodiments of the present invention.

A glass ceramic layer having a composition stated in Table 1 below is formed and then transmittance of the glass ceramic layer is measured. FIG. 2 illustrates a result of measurement of transmittance.

TABLE 1

| Division | Components (% by weight) | | | | | |
|---|---|---|---|---|---|---|
| | SiO$_2$ | Al$_2$O$_3$ | Na$_2$O | K$_2$O | TiO$_2$ | Se |
| Glass ceramic layer | 65.38 | 0.56 | 13.81 | 19.73~19.98 | 0.01 | 0.26 |

General transparent glass has visible light transmittance of 85% or more, and conventional dark glass to which a colorant and a decolorant are added (called privacy glass) has visible light transmittance of 20 to 25%. On the other hand, it may be understood from FIG. 2 that the glass ceramic layer in accordance with various embodiments of the present invention completely blocks visible light and ultraviolet light that have a wavelength of 800 nm or less.

Further, it may be understood that the glass ceramic layer of various embodiments of the present invention has a very high infrared light transmittance of 80% or more at a center wavelength (860 nm) of an LED lamp which is mainly used in the DSM.

The multilayer oxide thin film 12 has a configuration in which a first thin film including silicon (Si) and a second thin film including titanium (Ti) are alternately stacked, and, when light is incident upon the multilayer oxide thin film 12, interference of light occurs and transmittance in the infrared wavelength range is improved.

In order to generate interference of light, the multilayer oxide thin film 12 may be formed as below.

The multilayer oxide thin film 12 may be formed by alternately stacking a first thin film having a thickness of 10 to 500 nm and a second thin film having a thickness of 10 to 500 nm so as to produce a total of 10 to 50 layers. Further, the multilayer oxide thin film 12 may have a thickness of 1 to 100 μm.

The first thin film may be formed of silicon oxide (SiO2) having a refractive index of 1.45 to 1.55, and the second thin film may be formed of titanium dioxide (TiO2) having a refractive index of 2.40 to 2.60. Therefore, a difference between the refractive index of the first thin film and the refractive index of the second thin film may be 0.95 to 1.15.

Preferably, the first thin film may be formed so as to have a thickness of 60 to 70 nm by vacuum deposition of silicon oxide (SiO2), the second thin film may be formed so as to have a thickness of 110 to 120 nm by vacuum deposition of titanium dioxide (TiO2), and the multilayer oxide thin film 12 may be formed by alternately stacking the first thin film and the second thin film so as to produce a total of 30 to 40 layers.

The low reflectivity coating layer 13 has a configuration in which a first coating layer including silicon (Si) and a second coating layer including zirconium (Zr) are stacked, thus being capable of improving transmittance of light incident upon the infrared optical filter 10.

The multilayer oxide thin film 12 and the low reflectivity coating layer 13 are formed on both surfaces of the glass ceramic layer 11, thereby being capable of improving infrared light transmittance of the infrared optical filter 10. Although visible light transmittance and ultraviolet light transmittance are somewhat raised as infrared light transmittance is raised, in various embodiments of the present invention, visible light and ultraviolet light are almost completely blocked by increasing the content of potassium oxide (K2O) of glass ceramic and thus an infrared optical filter having a low visible light transmittance (20% or less) and a high infrared light transmittance (90% or more), as compared to a conventional optical filter, may be implemented.

In order to raise infrared light transmittance, as described above, the low reflectivity coating layer 13 may be formed as below.

The low reflectivity coating layer 13 may be formed by stacking a first coating layer having a thickness of 10 to 200 nm and a second coating layer having a thickness of 10 to 200 nm alternately or in any order so as to produce a total of 2 to 10 layers. Further, the low reflectivity coating layer 13 may have a thickness of 100 nm to 1 μm.

The first coating layer may be formed of silicon oxide (SiO2), and the second coating layer may be formed of zirconium oxide (ZrO2).

Preferably, the low reflectivity coating layer 13 may be formed by stacking the first coating layer formed of silicon oxide (SiO2) and having a thickness of 160 to 170 nm and the second coating layer formed of zirconium oxide (ZrO2) and having a thickness of 60 to 70 nm so as to produce a total of 2 layers.

Figure 3:
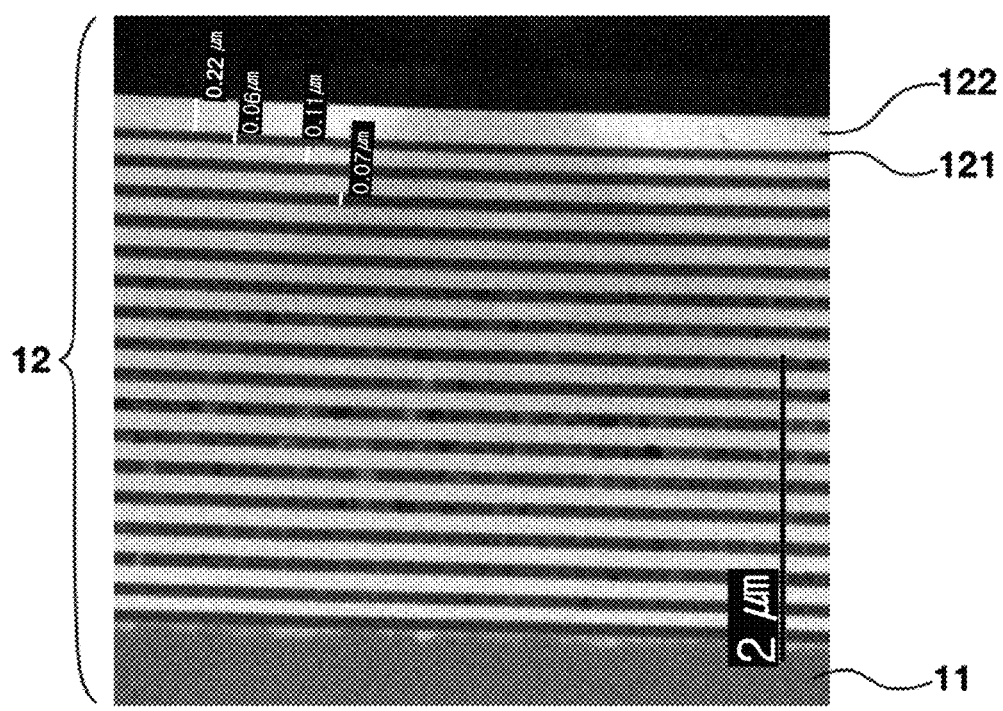
FIG. 3 is a Scanning Electron Microscope (SEM) image of the cross-section of a multilayer oxide thin film formed on one surface of the glass ceramic layer in accordance with various embodiments of the present invention.

FIG. 3 is a Scanning Electron Microscope (SEM) image of the cross-section of the multilayer oxide thin film 12 formed on one surface of the glass ceramic layer 11 (in a direction toward the light source). A first thin film 121 is formed to have a thickness of 60 to 70 nm by vacuum deposition of silicon oxide (SiO2). A second thin film 122 is formed to have a thickness of 110 to 120 nm by vacuum deposition of titanium dioxide (TiO2). The first thin film 121 and the second thin film 122 are alternately stacked 17 times so as to produce a total of 34 layers, thereby forming the multilayer oxide thin film.

Figure 4:
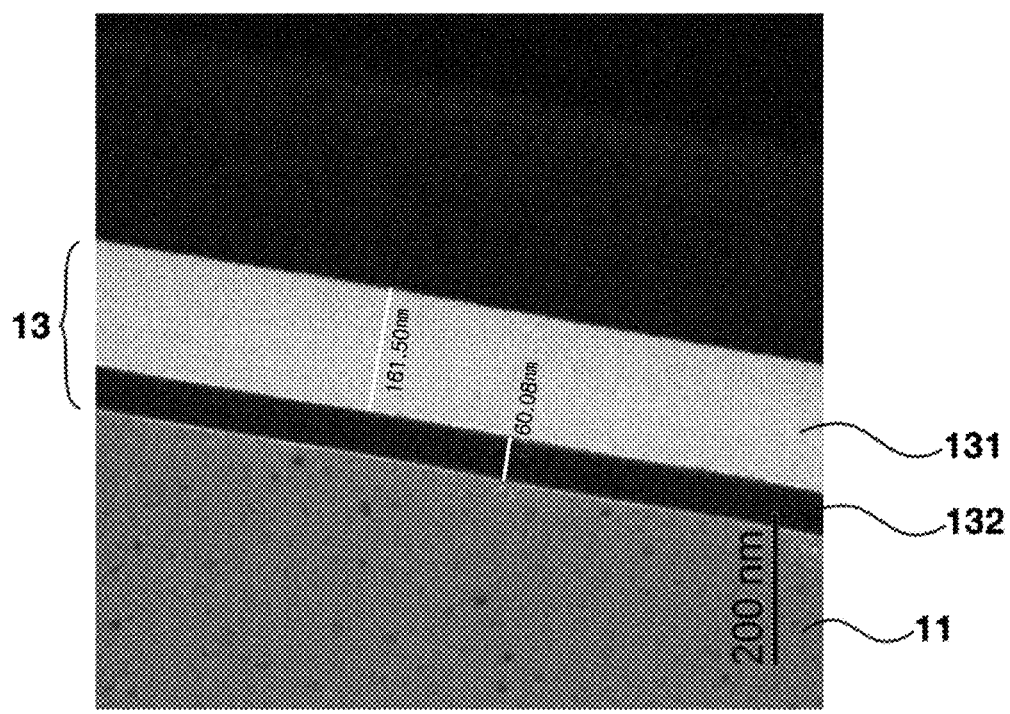
FIG. 4 is a Scanning Electron Microscope (SEM) image of the cross-section of a low reflectivity coating layer formed on the other surface of the glass ceramic layer in accordance with various embodiments of the present invention.

FIG. 4 is a Scanning Electron Microscope (SEM) image of the cross-section of the low reflectivity coating layer 13 formed on the other surface of the glass ceramic layer 11 in accordance with various embodiments of the present invention. A second coating layer 132 is formed by coating the other surface of the glass ceramic layer 11 with zirconium oxide (ZrO2) to a thickness of about 60 nm, and a first coating layer 131 is formed by coating the second coating layer 132 with silicon oxide (SiO2) to a thickness of about 161 nm.

Figure 5:
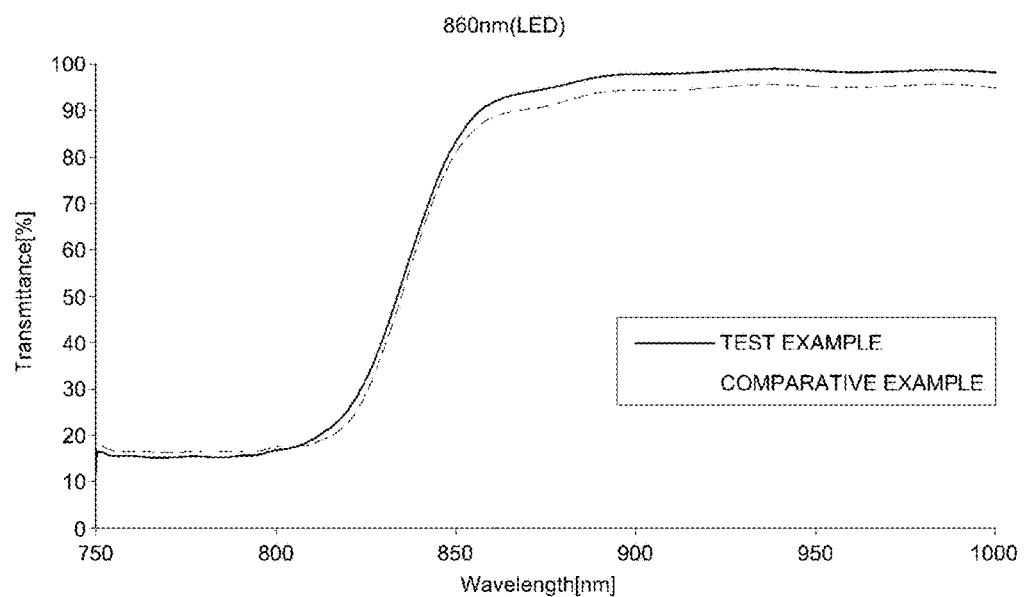
FIG. 5 is a graph illustrating a result of measurement of transmittances of the infrared optical filter in accordance with various embodiments of the present invention.

Transmittance of the infrared optical filter 10 shown in FIGS. 3 and 4, used as a Test example, is measured. FIG. 5 is a graph illustrating a result of measurement of transmittance of the infrared optical filter 10.

Here, in order to confirm improvement in transmittance by the low reflectivity coating layer 13, transmittance of an infrared optical filter including only a glass ceramic layer and a multilayer oxide thin film except for a low reflectivity coating layer, used as a Comparative example, is measured.

From a comparison between the infrared optical fiber of the Test example and the infrared optical filter of the Comparative example shown in FIGS. 2 and 5, it may be understood that, by forming the multilayer oxide thin film and the low reflectivity coating layer on the glass ceramic layer, visible light transmittance of the infrared optical filter of the Test example is somewhat raised but is still 20% or less, and thus the infrared optical fiber of the Test example still has improved visible light blocking ability, as compared to the above-described privacy glass (having visible light transmittance of about 20 to 25%).

Further, from a comparison between the infrared optical filter of Test example and the infrared optical filter of the Comparative example shown in FIG. 5, infrared light transmittance of the infrared optical filter of the Test example, further including the low reflectivity coating layer, in the infrared range, particularly, at a center wavelength (860 nm) of an LED lamp, is improved by about 3% (i.e., 89%→92%), as compared to the infrared optical filter of the Comparative example.

As is apparent from the above description, an infrared optical filter having the above configuration in accordance with various embodiments of the present invention has effects below.

The infrared optical filter in accordance with various embodiments of the present invention may completely block visible light and ultraviolet light and has a high infrared light transmittance, thus being properly applied to a driver state monitoring system (DSM), an iris identification system, etc.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An infrared optical filter comprising:
   a glass ceramic layer;
   a multilayer oxide thin film formed on a first surface of the glass ceramic layer; and
   a low reflectivity coating layer formed on a second surface of the glass ceramic layer,
   wherein the glass ceramic layer comprises:
   60 to 70% by weight of silicon oxide ($SiO_2$);
   0.1 to 1% by weight of aluminum oxide ($Al_2O_3$);
   10 to 20% by weight of sodium oxide ($Na_2O$);

19 to 20% by weight of potassium oxide ($K_2O$);
0.01 to 0.1% by weight of titanium dioxide ($TiO_2$); and
0.1 to 1% by weight of selenium (Se).

2. The infrared optical filter of claim 1, wherein the multilayer oxide thin film is formed by alternately stacking a first thin film including silicon (Si) and a second thin film including titanium (Ti).

3. The infrared optical filter of claim 2, wherein
the first thin film has a thickness ranging from 10 to 500 nm; and
the second thin film has a thickness ranging from 10 to 500 nm.

4. The infrared optical filter of claim 2, wherein
the first thin film is formed of silicon oxide ($SiO_2$); and
the second thin film is formed of titanium dioxide ($TiO_2$).

5. The infrared optical filter of claim 2, wherein
the first thin film has a refractive index ranging from 1.45 to 1.55; and
the second thin film has a refractive index ranging from 2.40 to 2.60.

6. The infrared optical filter of claim 2, wherein a difference between the refractive index of the first thin film and the refractive index of the second thin film ranges from 0.95 to 1.15.

7. The infrared optical filter of claim 1, wherein the multilayer oxide thin film comprises a total of 10 to 50 layers and a thickness ranging from 1 to 100 μm.

8. The infrared optical filter of claim 1, wherein the low reflectivity coating layer is formed by stacking a first coating layer including silicon (Si) and a second coating layer including zirconium (Zr).

9. The infrared optical filter of claim 8, wherein
the first coating layer has a thickness ranging from 10 to 200 nm; and
the second coating layer has a thickness ranging from 10 to 200 nm.

10. The infrared optical filter of claim 8, wherein
the first coating layer is formed of silicon oxide (SiO2); and
the second coating layer is formed of zirconium oxide (ZrO2).

11. The infrared optical filter of claim 1, wherein the low reflectivity coating layer has a total of 2 to 10 layers and a thickness ranging from 100 nm to 1 μm.

* * * * *